US012559137B2

(12) United States Patent
Wu et al.

(10) Patent No.:     US 12,559,137 B2
(45) Date of Patent:         Feb. 24, 2026

(54) SYSTEM AND METHOD FOR PROVIDING A SITUATIONAL AWARENESS BASED ADAPTIVE DRIVER VEHICLE INTERFACE

(71) Applicant: Honda Motor Co., Ltd., Tokyo (JP)

(72) Inventors: Tong Wu, New Brunswick, NJ (US);
Enna Sachdeva, San Jose, CA (US);
Kumar Akash, Milpitas, CA (US);
Teruhisa Misu, San Jose, CA (US)

(73) Assignee: Honda Motor Co., Ltd., Tokyo (JP)

( * ) Notice:    Subject to any disclaimer, the term of this patent is extended or adjusted under 35 U.S.C. 154(b) by 519 days.

(21) Appl. No.: 17/696,232

(22) Filed: Mar. 16, 2022

(65)          Prior Publication Data

US 2023/0202525 A1      Jun. 29, 2023

Related U.S. Application Data

(60) Provisional application No. 63/293,436, filed on Dec. 23, 2021.

(51) Int. Cl.
B60W 60/00          (2020.01)
(52) U.S. Cl.
CPC ... B60W 60/0016 (2020.02); B60W 2540/225 (2020.02); B60W 2554/80 (2020.02)
(58) Field of Classification Search
CPC ..... B60W 2050/146; B60W 2540/225; B60W 2554/80; B60W 30/0956; B60W 50/14; B60W 60/0016
See application file for complete search history.

(56)              References Cited

U.S. PATENT DOCUMENTS

2010/0253594 A1*  10/2010  Szczerba ................ G08G 1/167
                                                    345/7
2020/0189459 A1*   6/2020  Bush .................... G06V 20/597
2020/0307586 A1*  10/2020  Patel .............. B60W 60/00276
2022/0126837 A1*   4/2022  Croxford .............. B60W 50/16

OTHER PUBLICATIONS

K. Rayner and M. Castelhano, "Eye movements," Scholarpedia, vol. 2, No. 10, p. 3649, 2007.

(Continued)

*Primary Examiner* — Aniss Chad
(74) *Attorney, Agent, or Firm* — Rankin, Hill & Clark LLP

(57)              ABSTRACT

A system and method for providing a situational awareness based adaptive driver vehicle interface that include receiving data associated with a driving scene of an ego vehicle and eye gaze data and analyzing the driving scene and the eye gaze data and performing real time fixation detection pertaining to the driver's eye gaze behavior to determine a level of situational awareness with respect to objects that are located within the driving scene. The system and method also include determining at least one level of importance associated with each of the objects and communicating control signals to control at least one component based on at least one of: the at least one level of importance associated with each of the objects that are located within the driving scene and the level of situational awareness with respect to each of the objects that are located within the driving scene.

20 Claims, 6 Drawing Sheets

(56)           References Cited

OTHER PUBLICATIONS

M. Althoff, O. Stursberg, and M. Buss, "Model-based probabilistic collision detection in autonomous driving," IEEE Transactions on Intelligent Transportation Systems, vol. 10, No. 2, pp. 299-310, 2009.

Y. Barnard and F. Lai, "Spotting sheep in yorkshire: Using eyetracking for studying situation awareness in a driving simulator," in Human factors: a system view of human, technology and organisation. Annual conference of the Europe chapter of the human factors and ergonomics society 2009, 2010.

C. A. Bolstad, "Situation awareness: does it change with age?" in Proceedings of the human factors and ergonomics society annual meeting, vol. 45, No. 4. SAGE Publications Sage CA: Los Angeles, CA, 2001, pp. 272-276.

M. Colley, B. Eder, J. O. Rixen, and E. Rukzio, "Effects of semantic segmentation visualization on trust, situation awareness, and cognitive load in highly automated vehicles," in Proceedings of the 2021 CHI Conference on Human Factors in Computing Systems, 2021, pp. 1-11.

F. T. Durso, C. A. Hackworth, T. R. Truitt, J. Crutchfield, D. Nikolic, and C. A. Manning, "Situation awareness as a predictor of performance for en route air traffic controllers," Air Traffic Control Quarterly, vol. 6, No. 1, pp. 1-20, 1998.

M. R. Endsley, "Design and evaluation for situation awareness enhancement," Proceedings of the Human Factors Society Annual Meeting, vol. 32, No. 2, pp. 97-101, 1988.

M. R. Endsley, "Situation awareness global assessment technique (sagat)," in Proceedings of the IEEE 1988 national aerospace and electronics conference. IEEE, 1988, pp. 789-795.

Endsely, "Toward a theory of situation awareness in dynamic systems," Human factors, vol. 37, No. 1, pp. 32-64, 1995.

M. Gao, A. Tawari, and S. Martin, "Goal-oriented object importance estimation in on-road driving videos," in 2019 International Conference on Robotics and Automation (ICRA), 2019, pp. 5509-5515.

A. Gregoriades, A. Sutcliffe, G. Papageorgiou, and P. Louvieris, "Human-centered safety analysis of prospective road designs," IEEE Transactions on Systems, Man, and Cybernetics—Part A: Systems and Humans, vol. 40, No. 2, pp. 236-250, 2010.

C. Guo, J. Meguro, Y. Kojima, and T. Naito, "A multimodal adas system for unmarked urban scenarios based on road context understanding," IEEE Transactions on Intelligent Transportation Systems, vol. 16, No. 4, pp. 1690-1704, 2014.

A. Heenan, C. M. Herdman, M. S. Brown, and N. Robert, "Effects of conversation on situation awareness and working memory in simulated driving," Human factors, vol. 56, No. 6, pp. 1077-1092, 2014.

M. A. Just and P. A. Carpenter, "A theory of reading: From eye fixations to comprehension." Psychological review, vol. 87, No. 4, p. 329, 1980.

R. Kastner, T. Michalke, J. Adamy, J. Fritsch, and C. Goerick, "Taskbased environment interpretation and system architecture for next generation adas," IEEE Intelligent Transportation Systems Magazine, vol. 3, No. 4, pp. 20-33, 2011.

H. Kim, A. Miranda Anon, T. Misu, N. Li, A. Tawari, and K. Fujimura, "Look at me: Augmented reality pedestrian warning system using an in-vehicle volumetric head up display," in Proceedings of the 21st International Conference on Intelligent User Interfaces, ser. IUI '16. New York, NY, USA: Association for Computing Machinery, 2016, p. 294-298. [Online]. Available: https://doi.org/10.1145/2856767.2856815.

H. Kim, S. Martin, A. Tawari, T. Misu, and J. L. Gabbard, "Toward real-time estimation of driver situation awareness: An eye-tracking approach based on moving objects of interest," in 2020 IEEE Intelligent Vehicles Symposium (IV). IEEE, 2020, pp. 1035-1041.

J. J. Koenderink, A. J. van Doorn, and W. A. van de Grind, "Spatial and temporal parameters of motion detection in the peripheral visual field," JOSA A, vol. 2, No. 2, pp. 252-259, 1985.

P. Lindemann, T.-Y. Lee, and G. Rigoll, "Catch my drift: Elevating situation awareness for highly automated driving with an explanatory windshield display user interface," Multimodal Technologies and Interaction, vol. 2, No. 4, p. 71, 2018.

C. Merenda, H. Kim, K. Tanous, J. L. Gabbard, B. Feichtl, T. Misu, and C. Suga, "Augmented reality interface design approaches for goaldirected and stimulus-driven driving tasks," IEEE Transactions on Visualization and Computer Graphics, vol. 24, No. 11, pp. 2875-2885, 2018.

K. Moore and L. Gugerty, "Development of a novel measure of situation awareness: The case for eye movement analysis," in Proceedings of the human factors and ergonomics society annual meeting, vol. 54, No. 19. Sage Publications Sage CA: Los Angeles, CA, 2010, pp. 1650-1654.

E. Ohn-Bar and M. M. Trivedi, "Are all objects equal? deep spatiotemporalimportance prediction in driving videos," Pattern Recognition, vol. 64, pp. 425-436, 2017.

M. T. Phan, I. Thouvenin, and V. Frémont, "Enhancing the driver awareness of pedestrian using augmented reality cues," in 2016 IEEE 19th International Conference on Intelligent Transportation Systems (ITSC). IEEE, 2016, pp. 1298-1304.

A. K. Pradhan, K. R. Hammel, R. DeRamus, A. Pollatsek, D. A. Noyce, and D. L. Fisher, "Using eye movements to evaluate effects of driver age on risk perception in a driving simulator," Human factors, vol. 47, No. 4, pp. 840-852, 2005.

V. Ramanishka, Y.-T. Chen, T. Misu, and K. Saenko, "Toward driving scene understanding: A dataset for learning driver behavior and causal reasoning," in Proceedings of the IEEE Conference on Computer Vision and Pattern Recognition (CVPR), Jun. 2018.

M. Rucci and M. Poletti, "Control and functions of fixational eye movements," Annual review of vision science, vol. 1, pp. 499-518, 2015.

D. Sirkin, N. Martelaro, M. Johns, and W. Ju, "Toward measurement of situation awareness in autonomous vehicles," in Proceedings of the 2017 CHI Conference on Human Factors in Computing Systems, 2017, pp. 405-415.

R. M. Taylor, "Situational awareness rating technique (sart): The development of a tool for aircrew systems design," in Situational awareness. Routledge, 2017, pp. 111-128.

Y. Tong and B. Jia, "An augmented reality-based warning interface for pedestrians: User interface design and evaluation," in Proceedings of the Human Factors and Ergonomics Society Annual Meeting, vol. 63, No. 1. Sage Publications Sage CA: Los Angeles, CA, 2019, pp. 1834-1838.

W. L. Waag and M. R. Houck, "Tools for assessing situational awareness in an operational fighter environment." Aviation, space, and environmental medicine, 1994.

T. J. Wright, S. Samuel, A. Borowsky, S. Zilberstein, and D. L. Fisher, "Experienced drivers are quicker to achieve situation awareness than inexperienced drivers in situations of transfer of control within a level 3 autonomous environment," in Proceedings of the Human Factors and Ergonomics Society Annual Meeting, vol. 60, No. 1. Sage Publications Sage CA: Los Angeles, CA, 2016, pp. 270-273.

T. Wu, N. Martelaro, S. Stent, J. Ortiz, and W. Ju, "Learning when agents can talk to drivers using the inagt dataset and multisensory fusion," Proceedings of the ACM on Interactive, Moble, Wearable and Ubiquitous Technologies, vol. 5, No. 3, pp. 1-28, 2021.

Y. Yang, B. Karakaya, G. C. Dominioni, K. Kawabe, and K. Bengler, "An hmi concept to improve driver's visual behavior and situation awareness in automated vehicle," in 2018 21st International Conference on Intelligent Transportation Systems (ITSC). IEEE, 2018, pp. 650-655.

A. O. Yontem, K. Li, D. Chu, V. Meijering, and L. Skrypchuk, "Prospective immersive human-machine interface for future vehicles: Multiple zones turn the full windscreen into a head-up display," IEEE Vehicular Technology Magazine, vol. 16, No. 1, pp. 83-92, 2020.

H. Zhu, T. Misu, S. Martin, X. Wu, and K. Akash, "Improving driver situation awareness prediction using human visual sensory and memory mechanism," arXiv preprint arXiv:2111.00087, 2021.

* cited by examiner

SYSTEM AND METHOD FOR PROVIDING A SITUATIONAL AWARENESS BASED ADAPTIVE DRIVER VEHICLE INTERFACE

This application claims priority to U.S. Provisional Application Ser. No. 63/293,436 filed on Dec. 23, 2021, which is expressly incorporated herein by reference.

BACKGROUND

Advanced Driver Assistance Systems (ADAS) are incredibly gaining popularity. A well-designed ADAS system may be developed to both partially and conditionally automate vehicles and may be helpful in reducing a driver's workload and/or increase vehicle autonomous operations. With the development of human machine interfaces (HMI), in-vehicle interaction techniques have been designed to provide warning alerts to drivers. However, prior research has suggested that driver's situational awareness could be distributed when multiple warning and alerts are provided to the driver. For example, displaying a higher number of irrelevant warnings may increase the driver's workload and may potentially overwhelm the driver or result in the driver ignoring some of the warnings.

BRIEF DESCRIPTION

According to one aspect, a computer-implemented method for providing a situational awareness based adaptive driver vehicle interface, that includes receiving data associated with a driving scene of an ego vehicle and eye gaze data to track a driver's eye gaze behavior with respect to the driving scene. The computer-implemented method also includes analyzing the driving scene and the eye gaze data and performing real time fixation detection pertaining to the driver's eye gaze behavior with respect to objects that are located within the driving scene to determine a level of situational awareness with respect to each of the objects that are located within the driving scene. The computer-implemented method additionally includes determining at least one level of importance associated with each of the objects that are located within the driving scene. The computer-implemented method further includes communicating control signals to electronically control at least one component of the ego vehicle based on at least one of: the at least one level of importance associated with each of the objects that are located within the driving scene and the level of situational awareness with respect to each of the objects that are located within the driving scene.

According to another aspect, a system for providing a situational awareness based adaptive driver vehicle interface that includes a memory storing instructions when executed by a processor cause the processor to receive data associated with a driving scene of an ego vehicle and eye gaze data to track a driver's eye gaze behavior with respect to the driving scene. The instructions also cause the processor to analyze the driving scene and the eye gaze data and performing real time fixation detection pertaining to the driver's eye gaze behavior with respect to objects that are located within the driving scene to determine a level of situational awareness with respect to each of the objects that are located within the driving scene. The instructions additionally cause the processor to determine at least one level of importance associated with each of the objects that are located within the driving scene. The instructions further cause the processor to communicate control signals to electronically control at least one component of the ego vehicle based on at least one of:

the at least one level of importance associated with each of the objects that are located within the driving scene and the level of situational awareness with respect to each of the objects that are located within the driving scene.

According to yet another aspect, a non-transitory computer readable storage medium storing instruction that when executed by a computer, which includes a processor perform a method, the method includes receiving data associated with a driving scene of an ego vehicle and eye gaze data to track a driver's eye gaze behavior with respect to the driving scene. The method also includes analyzing the driving scene and the eye gaze data and performing real time fixation detection pertaining to the driver's eye gaze behavior with respect to objects that are located within the driving scene to determine a level of situational awareness with respect to each of the objects that are located within the driving scene. The method additionally includes determining at least one level of importance associated with each of the objects that are located within the driving scene. The method further includes communicating control signals to electronically control at least one component of the ego vehicle based on at least one of: the at least one level of importance associated with each of the objects that are located within the driving scene and the level of situational awareness with respect to each of the objects that are located within the driving scene.

BRIEF DESCRIPTION OF THE DRAWINGS

The novel features believed to be characteristic of the disclosure are set forth in the appended claims. In the descriptions that follow, like parts are marked, throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
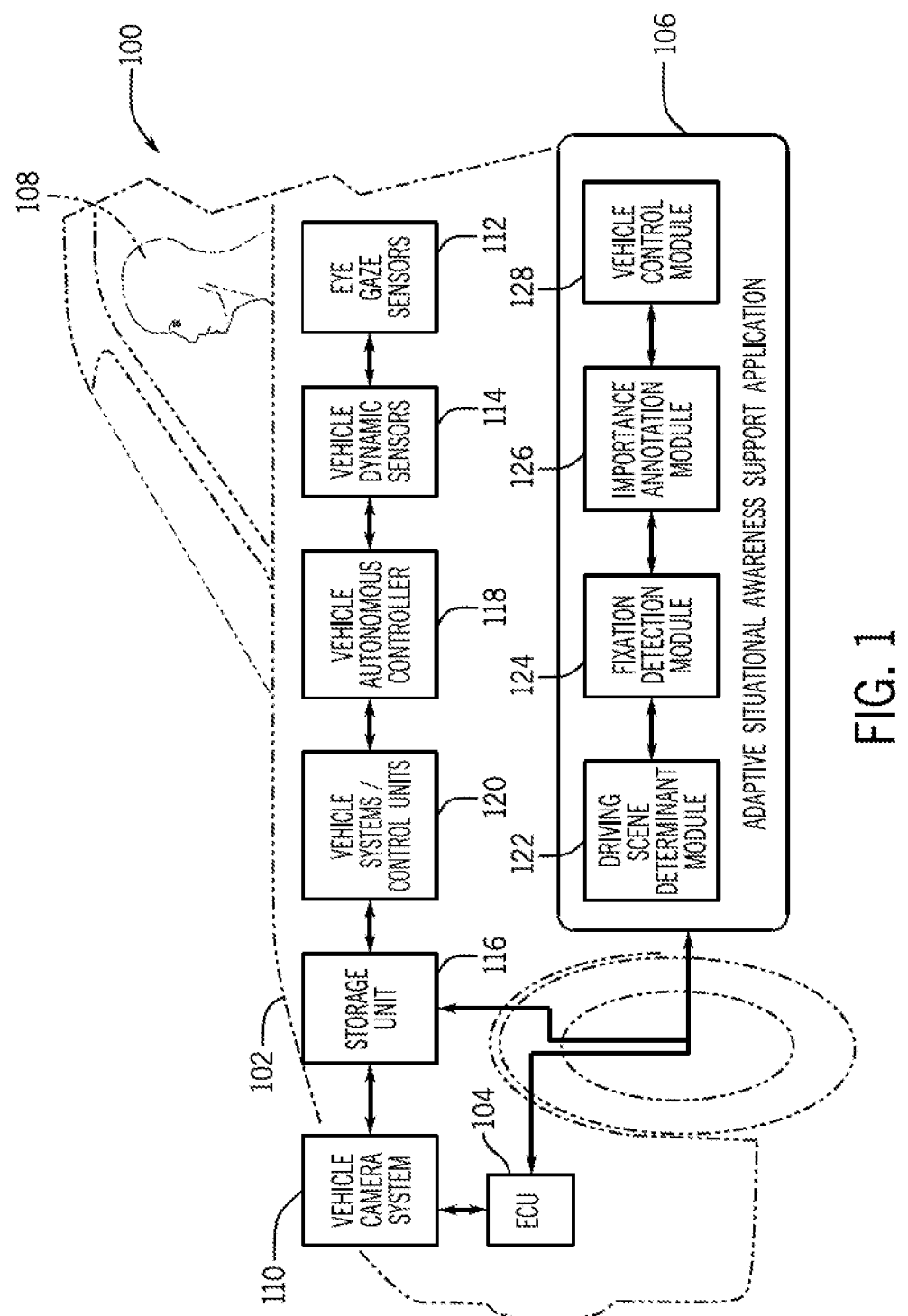
FIG. 1 is a schematic view of an exemplary system for providing a situational awareness based adaptive driver vehicle interface according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for providing a situational awareness based adaptive driver vehicle interface according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego vehicle 102 that includes an electronic control unit (ECU) 104 that executes one or more applications, operating systems, vehicle system and subsystem user interfaces, among others. The ECU 104 may also execute an adaptive situational awareness support application (awareness support application) 106 that may be configured to provide an adaptive driver awareness support system that may be based on different levels of importance that are annotated with respect to objects (e.g., additional vehicles, pedestrians, traffic infrastructure) that may be located within a driving scene of the ego vehicle 102 and/or a situational awareness of a driver

108 of the ego vehicle 102 with respect to the objects that may be located within the driving scene of the ego vehicle 102.

Figure 2:
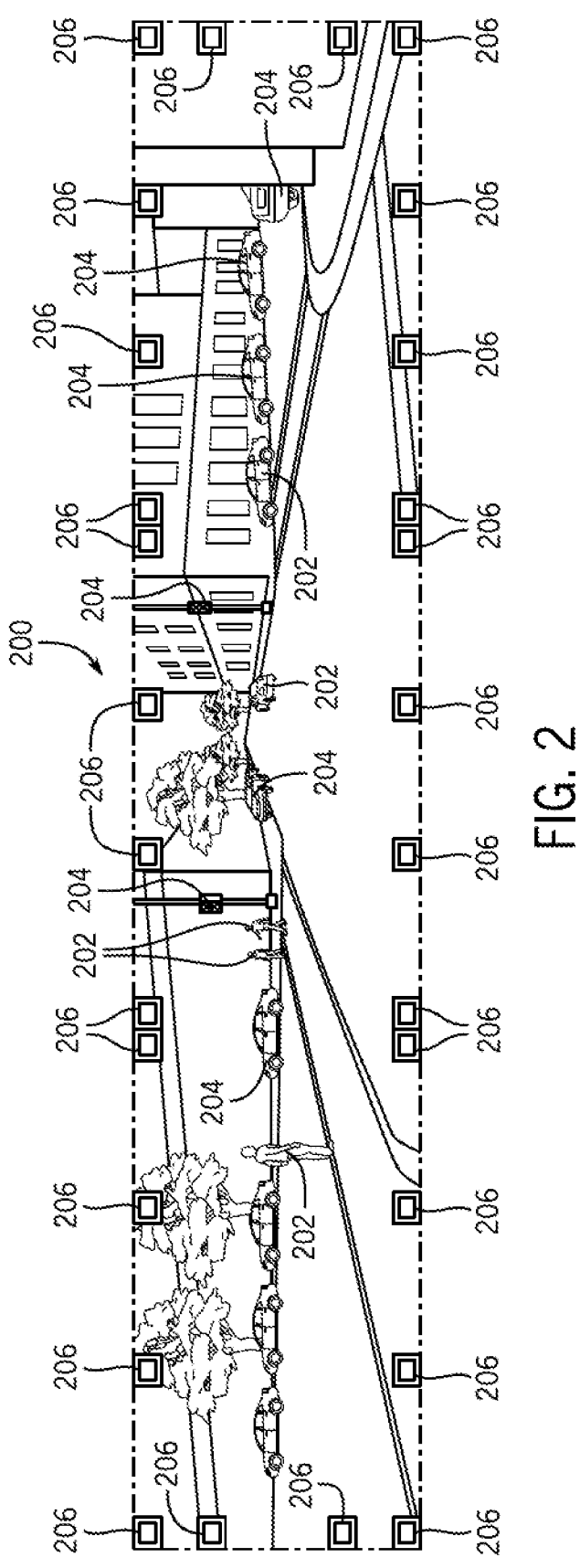
FIG. 2 is an exemplary illustration of the driving scene of the ego vehicle according to an exemplary embodiment of the present disclosure.

FIG. 2 includes an exemplary illustration of the driving scene 200 of the ego vehicle 102 according to an exemplary embodiment of the present disclosure. The driving scene 200 of the ego vehicle 102 may include a surrounding environment that may be located within a predetermined vicinity of the ego vehicle 102. The driving scene 200 may include roadways, intersections, sidewalks, dynamic objects 202 (e.g., pedestrians, other vehicles, etc.), and/or static objects 204 (e.g., traffic posts, traffic lights, buildings, trees, guardrails, etc.). With continued reference to FIG. 1 and FIG. 2, as discussed in more detail below, the awareness support application 106 may be configured to receive image data from a vehicle camera system 110 of the ego vehicle 102 that pertains to the driving scene 200 of the ego vehicle 102.

In one embodiment, the awareness support application 106 may be configured to analyze the image data to classify objects located within the driving scene 200. The objects 202, 204 may be classified as particular types of dynamic objects 202 (e.g., cars, trucks, pedestrians, bicyclists, etc.) and static objects 204 (e.g., traffic light, traffic signage, poles, guardrails, etc.). Upon classifying the dynamic objects 202 and static objects 204, the awareness support application 106 may be configured to identify particular types of dynamic objects 202 and particular types of static objects 204. The awareness support application 106 may further determine a number of dynamic objects 202 and a position of dynamic objects 202 that may be traveling within the driving scene 200. In one embodiment, the awareness support application 106 may be configured to analyze the number of dynamic objects 202, in addition to a configuration of roadways, intersections, sidewalks that may be located within the driving scene 200 to determine a driving scene complexity value of the driving scene 200.

The awareness support application 106 may also be configured to label gaze fixations that may pertain to the eye gaze of the driver 108 of the ego vehicle 102 with respect to each dynamic object 202 and/or each static object 204 that may be located within the driving scene 200 of the ego vehicle 102. The labeling of the gaze fixations of the driver 108 may be determined based on eye gaze data that is output by eye gaze sensors 112 of the ego vehicle 102. As discussed below, the eye gaze sensors 112 may be configured to provide eye gaze data that includes gaze coordinates as normalized values to the awareness support application 106.

The awareness support application 106 may thereby transfer the values in pixels based on the dimension of images of the driving scene 200 as included within the image data provided by the vehicle camera system 110. As discussed in more detail below, the awareness support application 106 may be configured to complete fixation identification by separating and labeling fixations and saccades pertaining to the driver's eye gaze with respect to each of the dynamic objects 202 and/or each of the static objects 204 located within the driving scene 200 of the ego vehicle 102.

In an exemplary embodiment, the awareness support application 106 may configured to complete importance ranking of each of the dynamic objects 202 in the driving scene 200 based on the position of the respective dynamic objects 202 with respect to the position of the ego vehicle 102 within the driving scene 200. The awareness support application 106 may configured to complete importance ranking of each of the static objects 204 based on a level of impact each respective static object 204 may have on a prospective operation of the ego vehicle 102 within the driving scene 200. In one configuration, the awareness support application 106 may utilize numerous levels of importance to annotate the importance of objects 202, 204 with respect to any potential overlap with respect to a traveling path of the ego vehicle 102. The numerous levels of importance may be objective in nature such that they are not subjectively tied to an experience, age, driving frequency, driving style, etc. of any particular driver. The numerous levels of importance that may be annotated to respective objects 202, 204 may include, but may not be limited to high importance objects, medium importance objects, and low importance objects.

Figure 3:
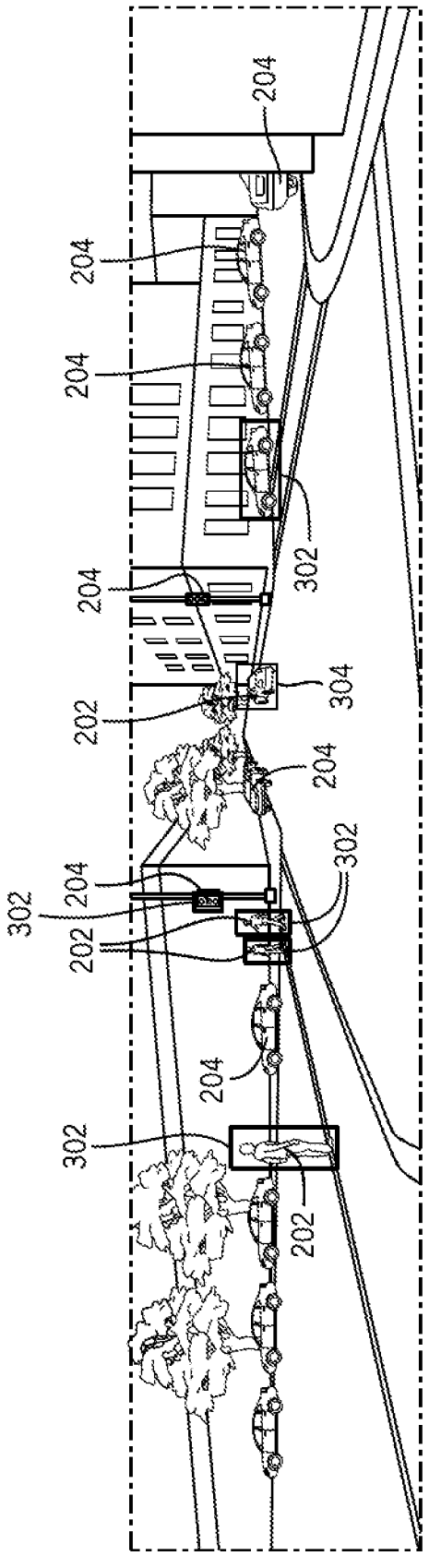
FIG. 3 is an exemplary illustration of a situational awareness based adaptive driver vehicle human machine interface according to an exemplary embodiment of the present disclosure.

The awareness support application 106 may be configured to control one or more components of the ego vehicle 102 to present a situational awareness based adaptive driver vehicle human machine interface (HMI) in the form of an Advanced Driver Assistance Systems (ADAS) user interface that presents augmented reality cues (AR cues). The AR cues may be provided as selective color-coded highlighting of one or more dynamic objects 202 and/or one or more static objects 204 that are located within the driving scene 200 based on the annotated level of importance associated with each of the objects 202, 204 and/or the driver's level of situational awareness with respect to each of the objects 202, 204. In particular, (as shown in FIG. 3) one or more components of the ego vehicle 102 may be electronically controlled to selectively and/or subjectively provide AR cues to alert the driver 108 of high importance objects and medium importance objects that may be located within the driving scene 200.

This functionality may be utilized to selectively alert the driver 108 of the ego vehicle 102 of one or more dynamic objects 202 that may be traveling within the driving scene 200 that may include prospective trajectories which may overlap with a prospective trajectory of the ego vehicle 102. This functionality may also be utilized to alert the driver 108 of the ego vehicle 102 of one or more static objects 204 that may be located within the driving scene 200 that may be a potential cause for the operation of the ego vehicle 102 to be modified (e.g., braking to slow down and stop the ego vehicle 102 due to a red colored traffic light) at one or more future points in time.

In one embodiment, one or more dynamic objects 202 may be annotated as high importance objects if respective prospective paths of such objects are deemed to have an immediate risk of overlap with respect to a prospective travel path of the ego vehicle 102. Accordingly, if a prospective path of the ego vehicle 102 may overlap with a prospective path of a dynamic object 202, the dynamic object 202 may be annotated as a high importance object. Additionally, one or more static objects 204 may be annotated as high importance objects based on an immediacy of the modification of the operation of the ego vehicle 102 based on their presence within the driving scene 200. Accordingly, if the operation of the ego vehicle 102 will need to be modified at one or more immediate future time steps based on the presence of a static object 204 (e.g., stop sign), the static object 204 may be annotated as a high importance object.

In some embodiments, one or more objects 202, 204 may be annotated as high importance objects based on a low level of situational awareness of the driver 108 with respect to objects 202, 204 that may impact a prospective operation of the ego vehicle 102. Accordingly, if the driver 108 of the ego vehicle 102 has a low level of situational awareness of a dynamic object 202 and/or a static object 204 that may impact the operation of the ego vehicle 102 by causing the driver 108 of the ego vehicle 102 to modify the operation of the ego vehicle 102, such objects 202, 204 may be annotated as high importance objects.

In some embodiments, one or more dynamic objects 202 may be annotated as medium importance objects if they are not determined to have an immediate risk of overlap with respect to the travel path of the ego vehicle 102, but may affect the driver's future decisions at one or more future time steps (t+2, t+3, t+n) with respect to operation of the ego vehicle 102 within the driving scene 200. One or more static objects 204 may be annotated as medium importance objects based on a lower level of urgency with respect to a modification of the operation of the ego vehicle 102 (e.g., braking may occur within t+3 seconds). In additional embodiments, the medium importance of objects may additionally be labeled as such based on a moderate level of situational awareness of the respective objects 202, 204 that may affect the driver's future decisions with respect to operation of the ego vehicle 102. The moderate level of situational awareness may be a higher level of situational awareness than the low level of situational awareness which may used to annotate objects 202, 204 as high importance objects.

In one or more embodiments, objects 202, 204 may be annotated as low importance objects if they are determined to have minimal to no influence on future decisions of the driver 108 with respect to operation of the ego vehicle 102 within the driving scene 200. The low importance of objects may additionally be annotated as such based on a high level of situational awareness of driver 108 with respect to the respective objects 202, 204. The high level of situational awareness may be a higher level of situational awareness than the moderate level of situational awareness which may be used to annotate objects 202, 204 as medium importance objects.

Accordingly, the awareness support application 106 may provide an HMI within the ego vehicle 102 that may selectively alert the driver 108 of one or more dynamic objects 202 (e.g., additional vehicles, pedestrians, bicyclists, etc.) and/or one or more static objects 204 (e.g., traffic signals, stop signs, yield signs) that may be located within the driving scene 200 that may impact the prospective operation of the ego vehicle 102 as the driver 108 operates the ego vehicle 102 within the driving scene 200. In additional embodiments, the awareness support application 106 may provide autonomous vehicle commands to the ego vehicle 102 to autonomously or semi-autonomously operate the ego vehicle 102 to account for one or more dynamic objects 202 that may be determined as high importance objects and/or medium importance objects and/or that may be associated with a lower situational awareness of the driver 108 based on the gaze fixation of the driver's eye gaze.

The present disclosure accordingly describes a system and method that allows an improvement to a computer and the technology with respect to improving situational awareness of vehicle drivers and enabling the utilization of smart driver-assistance interfaces that classify and label objects based on their importance to the prospective operation of the ego vehicle 102 to improve driver situation awareness of particular important objects. This improvement to the computer and the technology provides electronic control of vehicle components to provide autonomous control and/or electronic feedback by situationally and selectively providing smart driver-assistance human machine interfaces and/or electronic vehicle controls that pertain to and/or account for objects 202, 204 that may be deemed important with respect to the prospective operation of the ego vehicle 102 and/or may be associated with a lower situational awareness of the driver 108 of the ego vehicle 102.

With continued reference to FIG. 1, the ECU 104 may be configured to be operably connected to a plurality of additional components of the ego vehicle 102, including the vehicle camera system 110, the eye gaze sensors 112, vehicle dynamic sensors 114, a storage unit 116, a vehicle autonomous controller 118, and vehicle systems/control units 120 of the ego vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 116 to execute the one or more applications, operating systems, vehicle system and subsystem user interfaces, and the like that are stored within the storage unit 116. In one embodiment, the ECU 104 may communicate with the vehicle autonomous controller 118 to execute autonomous driving commands to operate the ego vehicle 102 to be fully autonomously driven or semi-autonomously driven in a particular manner. As discussed below, the autonomous driving commands may be based on commands provided by the awareness support application 106 to navigate the ego vehicle 102 within the driving scene 200 to autonomously control one or more functions of the ego vehicle 102 to account for the driver's situational awareness with respect to respective dynamic objects 202 that are located within the driving scene 200 of the ego vehicle 102.

As discussed below, based on one or more executable command instructions that may be communicated by the awareness support application 106, the vehicle autonomous controller 118 may be configured to autonomously control the ego vehicle 102 to operate in a manner based on the one or more commands that are output by the awareness support application 106. As discussed, the awareness support application 106 may send autonomous control commands to the vehicle autonomous controller 118 to ensure that the ego vehicle 102 is autonomously operated to complete acceleration, braking, and/or steering in a way that accounts for dynamic objects 202 and/or static objects 204 that may be located at a relative position of the ego vehicle 102, that may require the ego vehicle 102 to modify its operation (e.g., by braking, turning, accelerating, etc.), and/or that may be associated with a lower situational awareness of the driver 108.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 116 to execute the one or more applications, operating systems, vehicle system and subsystem user interfaces, and the like that are stored within the storage unit 116.

In one embodiment, the ECU 104 may communicate with the vehicle autonomous controller 118 to execute autonomous driving commands to operate the ego vehicle 102 to be fully autonomously driven or semi-autonomously driven in a particular manner. As discussed below, the autonomous driving commands may be based on commands provided by the awareness support application 106 to navigate the ego vehicle 102 within the driving scene 200 to autonomously control one or more functions of the ego vehicle 102 to account for the determined level of importance that may be associated with one or more dynamic objects 202 and/or one or more static objects 204 located within the driving scene 200 and/or the driver's situational awareness with respect to respective dynamic objects 202 and/or static objects 204 that are located within the driving scene 200 of the ego vehicle 102.

As discussed below, based on one or more executable command instructions that may be communicated by the awareness support application 106, the vehicle autonomous controller 118 may be configured to autonomously control the ego vehicle 102 to operate in a manner that is based on the one or more commands that are output by the awareness support application 106. For example, the awareness support application 106 may send autonomous control commands to the vehicle autonomous controller 118 to ensure that the ego vehicle 102 is autonomously operated to complete acceleration, braking, and/or steering in a way that accounts for objects 202, 204 that may be annotated as high importance objects and/or medium importance objects.

In one or more embodiments, the vehicle autonomous controller 118 may autonomously control the operation of the ego vehicle 102 by providing one or more commands to one or more of the vehicle systems/control units 120 to provide full autonomous or semi-autonomous control of the ego vehicle 102 to follow vehicle autonomous commands provided by the awareness support application 106. Such autonomous control of the ego vehicle 102 may be provided by sending one or more commands to control one or more of the vehicle systems/control units 120 to operate (e.g., drive) the ego vehicle 102 during one or more circumstances (e.g., when providing driver assist controls), and/or to fully control driving of the ego vehicle 102. For example, the vehicle autonomous controller 118 may operably control the vehicle systems/control units 120 of the ego vehicle 102 to autonomously operate the ego vehicle 102 according to the autonomous control commands to provide one or more driving maneuvers to account for the one or more dynamic objects 202 that may be annotated as high importance objects, one or more dynamic objects 202 that may be located within a prospective path of the ego vehicle 102, and/or one or more dynamic objects 202 that may be associated with a lower situational awareness of the driver 108 of the ego vehicle 102.

The one or more commands may be provided to one or more vehicle systems/control units 120 that include, but are not limited to a head unit, an engine control unit, a braking control unit, a transmission control unit, a steering control unit, and the like to control the ego vehicle 102 to be autonomously driven based on one or more autonomous commands that are output by the awareness support application 106. The one or more commands may also be provided to one or more vehicle systems/control units 120 that include one or more ADAS related systems and components to control the presentation of AR cues upon the ADAS user interface. Accordingly, the one or more vehicle systems/control units 120 may provide graphical visual alerts and/or audio alerts, autonomous control, and/or semi-autonomous control to assist in navigating the ego vehicle 102 within the driving scene 200 while accounting for one or more dynamic objects 202 and/or static objects 204 that are of importance with respect to the operation of the ego vehicle 102 at a present time step and one or more future time steps within the driving scene 200.

In one embodiment, the head unit of the ego vehicle 102 may include one or more display devices (e.g., center stack display device, head-up display) and audio devices (e.g., speakers) (not shown) that may provide ADAS alerts that pertain to objects 202, 204 that may be located within a particular distance of the ego vehicle 102, within a blind spot of the driver 108 of the ego vehicle 102, and/or within a prospective path of the ego vehicle 102. Such ADAS alerts may include graphical alerts or audio alerts that may be provided to alert of the driver 108 of the presence of such objects 202, 204.

With reference to FIG. 3, in one or more embodiments, the awareness support application 106 may be configured to provide one or more commands to control the ADAS to provide the ADAS user interface. The ADAS user interface may be presented to represent the driving scene 200 of the ego vehicle 102 based on image data provided by the vehicle camera system 110. In an exemplary embodiment, the awareness support application 106 may be configured to process AR cues in the form of highlighted color-coded bounding boxes 302, 304 that are presented to encapsulate respective dynamic objects 202 and/or static objects 204 that may be based on respective annotated levels of importance.

In one embodiment, objects 202, 204 that may be annotated as high importance objects may be processed with particular color-coded bounding boxes 302 (e.g., dark orange) that may change in color intensity, hue, and/or may be associated with respective audio alerts. The AR cues associated with the high importance objects may be presented in various formats based on the position of the ego vehicle 102 with respect to the respective object(s) 202, 204, a determined driving scene complexity value associated with the driving scene 200, dynamic data associated with the operation of the ego vehicle 102 (e.g., speed, acceleration, steering angle), and/or the situational awareness of the driver 108 of the ego vehicle 102 with respect to the respective object(s) 202, 204.

Additionally, objects 202, 204 that may be annotated as medium importance objects may be processed with particular color-coded bounding boxes 304 (e.g., light orange) that may be presented in a lower color intensity, hue, and/or may be associated with different audio alerts than provided for high importance objects. The AR cues associated with the medium importance objects may also be presented in various formats based on the position of the ego vehicle 102 with respect to the respective object(s) 202, 204, the determined driving scene complexity value associated with the driving scene 200, dynamic data associated with the operation of the ego vehicle 102, and/or the situational awareness of the driver 108 of the ego vehicle 102 with respect to the respective object(s) 202, 204.

The functionality of selectively processing and augmenting color-coded bounding boxes 302, 304 that are associated with high importance objects and/or medium importance objects may limit the number of ADAS warnings and/or alerts that may not be deemed as important with respect to the prospective operation of the ego vehicle 102. In other words, this functionality may ensure that unnecessary warnings that may increase the driver's workload during operation of the ego vehicle 102 are not provided. The awareness support application 106 accordingly enables ADAS warnings to be situationally and selectively provided as required to account for driving scene complexity, importance of respective objects 202, 204, and/or a lower situational awareness of particular objects 202, 204 that are located within the driving scene 200 of the ego vehicle 102 to provide an enhanced driver situational awareness of objects 202, 204 that are deemed to be important with respect to the operation of the ego vehicle 102.

Referring again to FIG. 1, the vehicle camera system 110 may include one or more of the cameras (not shown) that may be positioned in one or more directions and at one or more areas to capture one or more images of the driving scene 200 of the ego vehicle 102 (e.g., images of the roadway on which the ego vehicle 102 is traveling). The one or more cameras of the vehicle camera system 110 may be disposed at external front portions of the ego vehicle 102, including, but not limited to different portions of a vehicle dashboard, a vehicle bumper, vehicle front lighting units, vehicle fenders, and a vehicle windshield. In one embodiment, the one or more cameras may be configured as RGB cameras that may capture RGB bands that are configured to capture rich information about object appearance, as well as relationships and interactions between the ego vehicle 102 and one or more objects 202, 204 within the driving scene 200 of the ego vehicle 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the driving scene 200. The vehicle camera system 110 may be configured to convert one or more RGB images/videos (e.g., sequences of images) into image data that is communicated to the awareness support application 106 to be analyzed. As discussed below, image data provided by the vehicle camera system 110 may be communicated to the awareness support application 106 to be analyzed against the one or more object classifiers to classify dynamic objects 202 and static objects 204 captured within the image data as located within the driving scene 200.

In an exemplary embodiment, the eye gaze sensors 112 may be configured as one or more cameras located within the ego vehicle 102 and hardware configured to interpret video or image data sensed by the camera(s) to detect the driver's eye positions within the ego vehicle 102 in order to determine the driver's gaze points. In an alternate embodiment, the eye gaze sensors 112 may be included as part of a wearable device (e.g., wearable glasses) that may be configured to detect the driver's eye positions within the ego vehicle 102 in order to determine the driver's gaze points as the ego vehicle 102 is being operated within the driving scene 200. The driver's gaze points may pertain to a real-time gaze location of the driver 108 in a frame of refence of the driving scene 200.

As discussed below, the awareness support application 106 may be configured to analyze eye gaze data provided by the eye gaze sensors 112 against various areas of the driving scene 200. With continued reference to FIG. 1 and FIG. 2, the awareness support application 106 may be configured to analyze image data associated with image(s) of the driving scene 200 and identify a homography between the image(s) of the driving scene 200 and the driver's real-time eye gaze that is based on the driver 108 viewing the driving scene 200 (e.g., through a windshield of the ego vehicle 102).

In one embodiment, the homography between the image(s) of the driving scene 200 and the driver's real-time eye gaze towards the driving scene 200 may be identified by super imposing markers 206 around the edges of the image(s) of the driving scene 200. The awareness support application 106 may be configured to extract gaze coordinates as normalized values to the awareness support application 106. The awareness support application 106 may be configured to analyze the gaze coordinates with respect to the markers 206 to track the driver's eye gaze. In particular, the awareness support application 106 may be configured to transfer the values in pixels based on the dimension of images of the driving scene 200 as included within the image data provided by the vehicle camera system 110. The awareness support application 106 may thereby be configured to complete fixation identification by separating and labeling fixations and saccades pertaining to the driver's eye gaze with respect to each of the dynamic objects 202 and/or each of static objects 204 located within the driving scene 200 of the ego vehicle 102 to determine the driver's situational awareness with respect to one or more dynamic objects 202 and/or one or more static objects 204 located within the driving scene 200.

With continued reference to FIG. 1, in one or more embodiments, the storage unit 116 of the ego vehicle 102 may be configured to store one or more executable files associated with one or more operating systems, applications, associated operating system data, application data, vehicle system and subsystem user interface data, and the like that are executed by the ECU 104. In one embodiment, the storage unit 116 may be configured to store eye gaze data and/or image data that may be received by the awareness support application 106 at one or more points in time.

The awareness support application 106 may access the storage unit 116 to retrieve the eye gaze data and/or the image data to classify dynamic objects 202 located within the driving scene 200, classify static objects 204 located within the driving scene 200, determine the relative positions of dynamic objects 202, 204 within the driving scene 200, determine the traffic density of the driving scene 200, and/or to complete fixation identification with respect to each of the dynamic objects 202 and/or each of static objects 204 located within the driving scene 200. As discussed in more detail below, in one embodiment, the awareness support application 106 may be configured to utilize the storage unit 116 to store data points associated with one or more previous contexts that pertain to the presentation of AR cues at one or more past time steps (e.g., t–1, t–2, t–n). The storage unit 116 may be accessed to retrieve such data to modify the presentation of AR cues as based on the driver's situational awareness as the ADAS user interface is presented to the driver 108 based on a modification of an importance level that may annotated to any of the objects 202, 204.

II. The Situational Awareness Support Application and Related Methods

Components of the awareness support application 106 will now be described according to an exemplary embodiment and with continued reference to FIG. 1. In an exemplary embodiment, the awareness support application 106 may be stored on the storage unit 116 and executed by the ECU 104 of the ego vehicle 102. In another embodiment, the awareness support application 106 may be stored on an externally hosted computing infrastructure and may be accessed by a telematics control unit of the ego vehicle 102 to be executed by the ECU 104 of the ego vehicle 102.

The general functionality of the awareness support application 106 will now be discussed. In an exemplary embodiment, the awareness support application 106 may include a plurality of modules 122-128 that may be configured to provide a situational awareness based adaptive driver vehicle interface. The plurality of modules 122-128 may include a driving scene determinant module 122, a fixation detection module 124, an importance annotation module 126, and a vehicle control module 128. However, it is appreciated that the awareness support application 106 may include one or more additional modules and/or sub-modules that are included in lieu of the modules 122-128.

Figure 4:
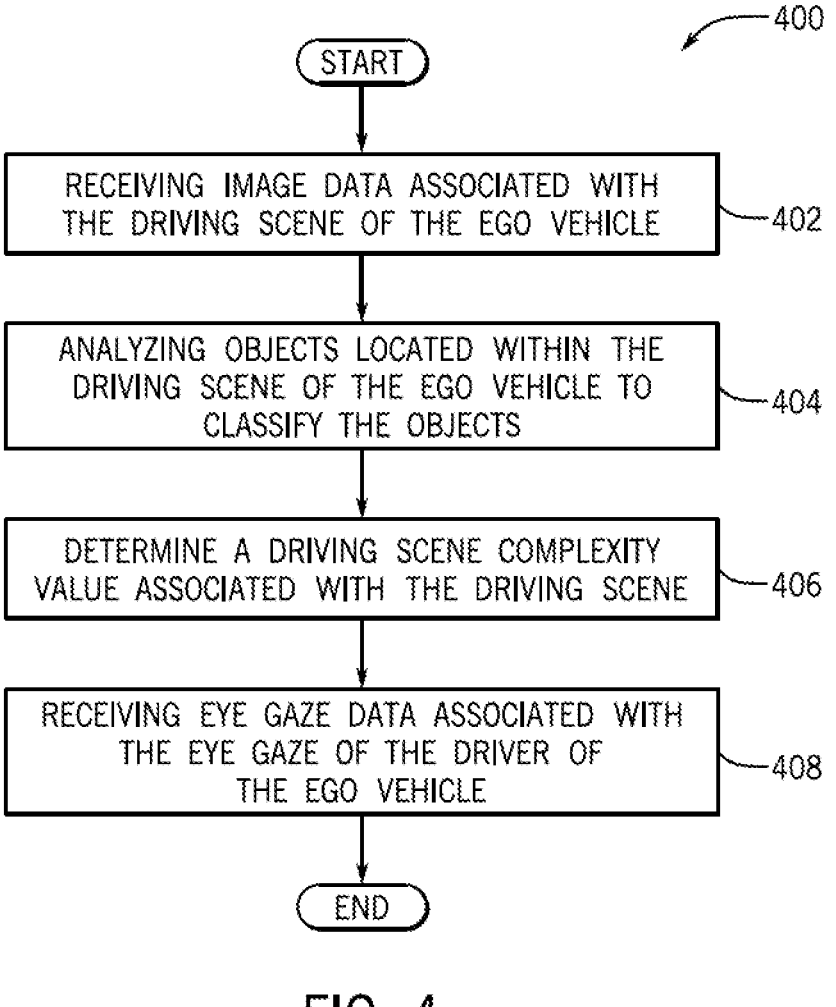
FIG. 4 is a process flow diagram of a method for receiving and analyzing data associated with the driving scene of the ego vehicle and the driver's eye gaze according to an exemplary embodiment of the present disclosure.

FIG. 4 is a process flow diagram of a method 400 for receiving and analyzing data associated with the driving scene 200 of the ego vehicle 102 and the driver's eye gaze according to an exemplary embodiment of the present disclosure. FIG. 4 will be described with reference to the components of FIG. 1 though it is to be appreciated that the method 400 of FIG. 4 may be used with other systems/ components. The method 400 may begin at block 402, wherein the method 400 may include receiving image data associated with the driving scene 200 of the ego vehicle 102.

In one embodiment, the driving scene determinant module 122 of the awareness support application 106 may be configured to communicate with the vehicle camera system 110 to collect image data associated with untrimmed images/ video of the driving scene 200 of the ego vehicle 102. In some configurations, the image data may pertain to one or more first person viewpoint RGB images/videos of the driving scene 200 of the ego vehicle 102. In particular, the image data may pertain to one or more RGB images/video of the surrounding dynamic objects 202 and static objects 204 that are located within the driving scene 200 that are captured by one or more cameras that are operably connected to the vehicle camera system 110. In some embodiments, the driving scene determinant module 122 may package and store the image data on the storage unit 116 to be evaluated at one or more points in time.

The method 400 may proceed to block 404, wherein the method 400 may include analyzing objects 202, 204 located within the driving scene 200 of the ego vehicle 102 to classify the objects 202, 204. In an exemplary embodiment, the driving scene determinant module 122 may be configured to analyze image data using artificial intelligence capabilities to compare image data against one or more object classifiers that may be stored upon the storage unit 116 of the ego vehicle 102.

In particular, the driving scene determinant module 122 may be configured to access the storage unit 116 of the ego vehicle 102 to analyze one or more object classifiers that are stored upon the storage unit 116. The one or more object classifiers may include pre-trained object classification data that may be associated with aggregated image coordinates that may pertain to specific types of static objects 204 (e.g., trees, street signs, traffic signals, poles, guard rails, etc.) and specific types of dynamic objects 202 (e.g., cars, trucks, pedestrians, bicyclists, etc.) to classify the dynamic objects 202 and the static objects 204 that are located within the driving scene 200 of the ego vehicle 102.

More specifically, the driving scene determinant module 122 may be configured to analyze the image data to extract image coordinates that may pertain to each of the dynamic objects 202 and each of the static objects 204 that are captured as being located within the driving scene 200. The driving scene determinant module 122 may be configured to analyze the image data and may compute bounding boxes around each of the objects 202, 204 located within the image(s) as captured by the vehicle camera system 110. Upon the processing of bounding boxes around each of the objects 202, 204, the driving scene determinant module 122 may be configured to analyze the one or more object classifiers to compare the objects 202, 204 included within the bounding boxes against the pre-trained object classification data to thereby classify the objects 202, 204 as specific types of dynamic objects 202 and specific types objects 204 that are located within the driving scene 200 of the ego vehicle 102.

The driving scene determinant module 122 may also be configured to execute image logic to determine additional physical characteristics that may pertain to color, shape, size, and/or identification of specific features to identify traffic signals, street signage, vehicle color, and/or additional physical characteristics that may be associated with each of the dynamic objects 202 and static objects 204 that may be located within the driving scene 200. In some configurations, the driving scene determinant module 122 may also be configured to analyze the image data to determine relative positional coordinates that pertain to a relative position of each of the dynamic objects 202 and each of the static objects 204 that are located within the driving scene 200 with respect to the real-time position of the ego vehicle 102. For example, the driving scene determinant module 122 may utilize the pre-trained object classification data to determine the existence of a traffic light and may execute image logic to determine a specific traffic light signal color of the traffic light and the relative position of the traffic light with respect to a travel path of the ego vehicle 102 within the driving scene 200.

The method 400 may proceed to block 406, wherein the method 400 may include determining a driving scene complexity value associated with the driving scene 200. In one embodiment, the driving scene determinant module 122 may be configured to analyze the image data associated with the classified dynamic objects 202 and the classified static objects 204 that are located within the driving scene 200 as previously classified (at block 404). The driving scene determinant module 122 may also be configured to electronically analyze the image data against stored image logic to determine roadway configurations, intersection configurations, sidewalk configurations, a terrain of the driving scene 200, and/or environmental conditions occurring within the driving scene 200 (e.g., weather conditions, road conditions).

In an exemplary embodiment, the driving scene determinant module 122 may be configured to analyze a number of dynamic objects 202, one or more particular types of static objects 204, roadway configurations, intersection configurations, sidewalk configurations, a terrain of the driving scene 200, and/or environmental conditions occurring within the driving scene 200. The driving scene determinant module 122 may thereby output a driving scene complexity value (e.g., range from 0.00 to 10.00) that may be associated with the traffic density, driving/traffic conditions, traffic regulations, and/or configurations of the driving scene 200. Stated differently, the driving scene complexity value may pertain to a level of complexity that may be associated with operating (e.g. navigating) the ego vehicle 102 within the driving scene 200.

With continued reference to the method 400 of FIG. 4, the method 400 may proceed to block 408, wherein the method 400 may include receiving eye gaze data associated with the eye gaze of the driver 108 of the ego vehicle 102. In an exemplary embodiment, the driving scene determinant module 122 may be configured to communicate the image data associated with the driving scene 200 to the fixation detection module 124 of the awareness support application 106. In an exemplary embodiment, the fixation detection module 124 may be configured to communicate with the eye gaze sensors 112 of the ego vehicle 102 to receive eye gaze data associated with the eye gaze of the driver 108 of the ego vehicle 102 (e.g., received for a period of time during which the dynamic objects 202 and the static objects 204 have been classified by the driving scene determinant module 122).

As discussed, the eye gaze sensors 112 may be configured as one or more cameras and hardware that may be configured to interpret video or image data sensed by the camera(s) to detect the driver's eye positions within the ego vehicle 102 in order to determine the driver's gaze points. In an alternate embodiment, the eye gaze sensors 112 may be included as part of a wearable device that may be configured to detect the driver's eye positions within the ego vehicle 102 in order to determine the driver's gaze points as the ego vehicle 102 is being operated within the driving scene 200.

Figure 5:
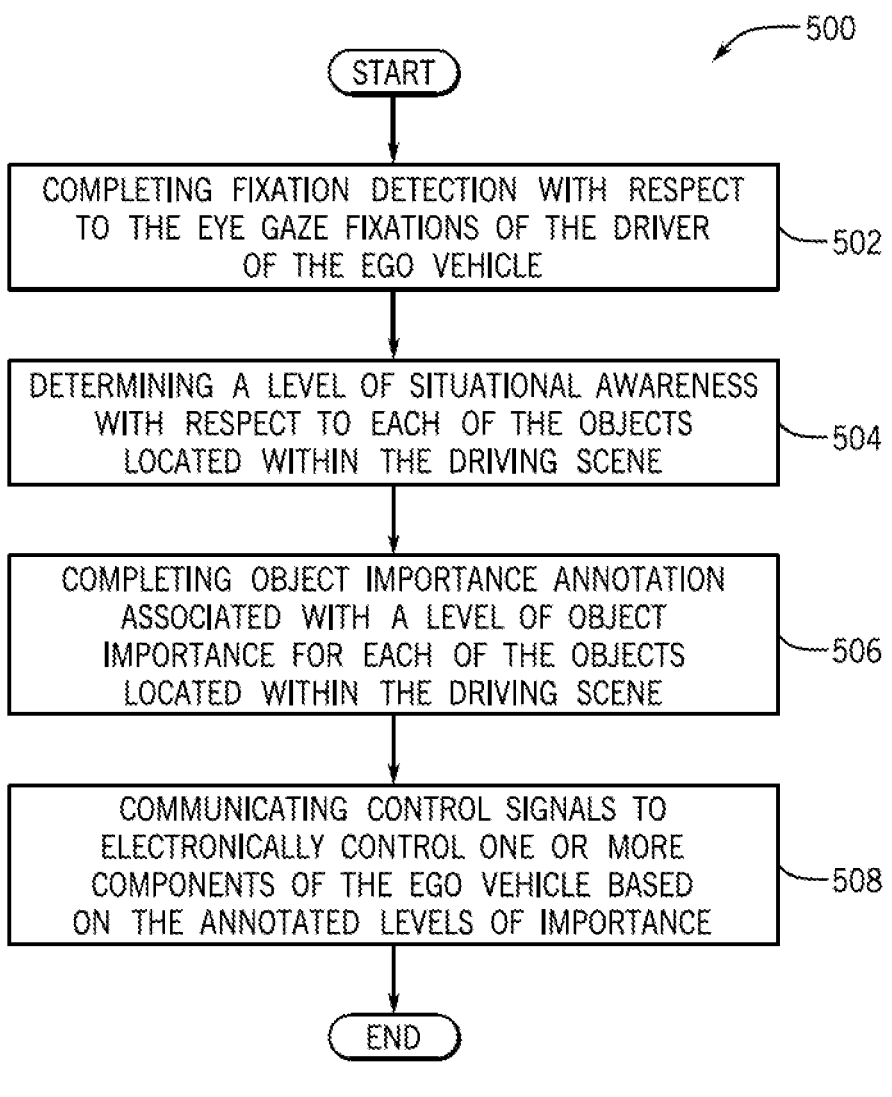
FIG. 5 is a process flow diagram of a method for electronically controlling at least one component of the ego vehicle based on a level of importance associated with each of the objects that are located within the driving scene according to an exemplary embodiment of the present disclosure.

FIG. 5 is a process flow diagram of a method 500 for electronically controlling at least one component of the ego vehicle 102 based on a level of importance associated with each of the objects 202, 204 that are located within the driving scene 200 according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 may include completing fixation detection with respect to the eye gaze fixations of the driver 108 of the ego vehicle 102.

In an exemplary embodiment, the fixation detection module 124 may be configured to analyze the eye gaze data communicated by the eye gaze sensors 112 of the ego vehicle 102 along with the image data that may be based on the image(s) captured of the driving scene 200 by the vehicle camera system 110. In one configuration, the fixation detection module 124 may be configured to extract eye gaze coordinates and may analyze the eye gaze coordinates against various areas of the driving scene 200 captured within the image data. In particular, the fixation detection module 124 may be configured to analyze image data associated with image(s) of the driving scene 200 and eye gaze coordinates extracted from eye gaze data that are associated with matching time steps (e.g., at a simultaneous point in time) to identify a homography between the image(s) of the driving scene 200 and the driver's real-time eye gaze as the driver 108 views the driving scene 200 (e.g., through a windshield of the ego vehicle 102 during operation of the ego vehicle 102).

In one embodiment, the fixation detection module 124 may be configured to super impose markers 206 around the edges of the image(s) of the driving scene 200. Upon super imposing the markers 206, the fixation detection module 124 may be configured to analyze the eye gaze coordinates with respect to the markers 206 to track the driver's eye gaze that pertains to the particular portions of the driving scene 200 which may include one or more dynamic objects 202 and/or one or more static objects 204 to identify the homography between the image(s) of the driving scene 200 and the driver's real-time eye gaze towards the driving scene 200. In particular, the fixation detection module 124 may be configured to track the eye gaze of the driver 108 by also tracking the markers in real time during a duration of a video image stream to identify the homography between the image(s) captured of the driving scene 200 by the vehicle camera system 110 and may transform the eye gaze of the driver 108 as determined by the eye gaze sensors 112 to the specific portions of the driving scene 200 as included within the video image stream.

In an exemplary embodiment, the fixation detection module 124 may perform a calibration between the image data and the eye gaze data to reduce the latency during data transition. Since the raw gaze coordinates provided by the eye gaze sensors 112 are normalized values, the fixation detection module 124 may be configured to transfer the values in pixels based on the dimension of the images of the driving scene 200 as included within the image data provided by the vehicle camera system 110. The fixation detection module 124 may thereby be configured to complete fixation identification by analyzing time coordinates associated with a time of fixation that pertains to different portions of the driving scene 200.

In one embodiment, upon analyzing the time of fixation that pertains to different portions of the driving scene 200, the fixation detection module 124 may be configured to separate and label fixations and saccades pertaining to the driver's eye gaze with respect to each of the dynamic objects 202 and/or each of static objects 204 located within the different portions of the driving scene 200 by utilizing a particular time-based fixation threshold. In particular, the fixation detection module 124 may analyze a time of fixation of the driver's eye gaze which may fall upon one or more objects 202, 204 and may compare the time of fixation to the time-based fixation threshold to determine if the driver's eye gaze was actually fixated upon the respective object 202, 204 or if the driver's eye gaze is part of a saccade that includes a rapid movement of the eye(s) between fixation points.

The method 500 may proceed to block 504, wherein the method 500 may include determining a level of situational awareness with respect to each of the objects 202, 204 located within the driving scene 200. In an exemplary embodiment, upon labeling fixations and saccades pertaining to the driver's eye gaze with respect to each of the dynamic objects 202 and/or each of static objects 204, the fixation detection module 124 may be configured to analyze the position of one or more dynamic objects 202 and one or more static objects 204 against the labeled fixations of the driver's eye gaze to determine a level of situational awareness with respect to each of the objects 202, 204 located within the driving scene 200.

In one embodiment, based on the labeling of the fixations of the driver's eye gaze, the fixation detection module 124 may be configured to analyze each fixation time of the eye gaze fixation of the driver 108 with respect to the one or more dynamic objects 202 and static objects 204 that may be located within respective portions of the driving scene 200. The fixation detection module 124 may also be configured to analyze a number of objects 202, 204 that may be included within the driving scene 200, relative sizes of the one or more objects 202, 204 that may be included within the eye gaze fixation of the driver 108 at one or more time steps, and/or additional attention capturing physical characteristics (e.g., color, shape, speed, trajectory) that may be associated with respect to one or more objects 202, 204 that may be included within the eye gaze fixation of the driver 108 within one or more time steps.

In one embodiment, based on the labeling and analyzing the fixations of the driver's eye gaze, the fixation detection module 124 may be configured to determine a situational awareness value (e.g., numeric value between 0.00 and 10.00) that may pertain to a level of attention allocation that the driver 108 of the ego vehicle 102 may place upon each dynamic object 202 and each static object 204 that may be located within the driving scene 200 of the ego vehicle 102 at one or more time steps. Upon determining the situational awareness value that the driver 108 of the ego vehicle 102 may place upon each of the objects 202, 204 located within the driving scene 200, the fixation detection module 124 may classify objects 202, 204 that may capture the attention of the driver 108, a level of attention allocation associated with the driver's eye gaze fixation and may assign a higher situational awareness value (e.g., 8-10) to such objects 202, 204.

The fixation detection module 124 may classify objects 202, 204 that may capture the attention of the driver 108 based on shorter timeframe of attention allocation of driver 108 than given to objects 202, 204 that are associated with a higher situational awareness value as being associated with a middle range situational awareness value (e.g., 3-7). The fixation detection module 124 may determine such objects 202, 204 as having a moderate level of situational awareness of the driver 108 of the ego vehicle 102.

Additionally, the fixation detection module 124 may classify objects 202, 204 that may only be within view of an eye gaze saccade that includes a rapid movement of the eye between fixation points and may be associated with a lower situational awareness value (e.g., 1-2) which is lower than the middle range situational awareness value. The fixation detection module 124 may determine such objects 202, 204 as having a low level of situational awareness the driver 108 of the ego vehicle 102. The fixation detection module 124 may also classify objects 202, 204 that may not be included within the eye gaze of the driver 108 as having a zero level of situational awareness of the driver of the ego vehicle 102. Such objects 202, 204 may be associated with a null (e.g., zero) situational awareness value.

In one embodiment, upon determining the levels of situational awareness of the driver 108 of the ego vehicle 102 with respect to each of the objects 202, 204 that may be located within the driving scene 200, the fixation detection module 124 may be configured to communicate data pertaining to the levels of situational awareness of the driver 108 to the importance annotation module 126 and the vehicle control module 128 of the awareness support application 106.

With continued reference to FIG. 5, upon determining the level of situational awareness with respect to each of the objects 202, 204 (at block 504), the method 500 may proceed to block 506, wherein the method 500 includes completing object importance annotation associated with a level of object importance for each of the objects 202, 204 located within the driving scene 200. In an exemplary embodiment, the importance annotation module 126 of the awareness support application 106 may be configured to utilize pre-annotated importance information to annotate one or more dynamic objects 202 and/or one or more static objects 204 as high importance objects, medium importance objects, or low importance objects.

The importance annotation module 126 may analyze the position, classification, dynamic properties of the ego vehicle 102 (e.g., speed, acceleration, steering angle) and dynamic properties (e.g., speed, acceleration) of dynamic objects 202 and may annotate dynamic objects 202 that may have an immediate risk of overlap due to a short driver reaction time period (e.g., less than three seconds) with respect to a prospective travel path of the ego vehicle 102 as high importance objects. The importance annotation module 126 may analyze the position, classification, dynamic properties of the ego vehicle 102 (e.g., speed, acceleration, steering angle) and characteristics of static objects 204 (e.g., type of traffic signal, type of road signage) and may annotate static objects 204 that may cause an immediate modification of the operation of the ego vehicle 102 due to a short driver reaction time period (e.g., less than three seconds) as high importance objects.

In one embodiment, the importance annotation module 126 may analyze the position, classification, dynamic properties of the ego vehicle 102 and dynamic properties of dynamic objects 202 and may annotate dynamic objects 202 that may not have an immediate risk of overlap (e.g., a moderate risk of overlap) as medium importance objects. In such circumstances, overlap may be avoided due to a longer driver reaction period (e.g., five or more seconds) with respect to the prospective travel path of the ego vehicle 102 and the respective dynamic objects 202. The importance annotation module 126 may analyze the position, classification, dynamic properties of the ego vehicle 102 (e.g., speed, acceleration, steering angle) and characteristics of static objects 204 (e.g., type of traffic signal, type of road signage) and may annotate static objects 204 that may not cause an immediate modification of the operation of the ego vehicle 102 but may affect the driver's future decisions with respect to operation of the ego vehicle 102 (e.g., a lower level of urgency with respect to a modification of the operation of the ego vehicle 102) within the driving scene 200 due to a longer driver reaction period (e.g., five or more seconds) as medium importance objects.

Additionally, the awareness support application 106 may annotate one or more dynamic objects 202 and/or static objects 204 as low importance objects that may pertain to objects 202, 204 that may not overlap with the prospective travel path of the ego vehicle 102 and may not have much influence on future decisions of the driver 108 with respect to operation of the ego vehicle 102 within the driving scene 200. In additional embodiments, the importance annotation module 126 may additionally analyze data associated with the level of situational awareness of the driver 108 to annotate respective objects 202, 204 as high importance objects, medium importance objects, or low importance objects.

In particular, the importance annotation module 126 may annotate objects 202, 204 that may be associated with a zero level or low level of situational awareness of the driver 108 and that may influence the operation of the ego vehicle 102 at one or more future time steps as high importance objects. The importance annotation module 126 may annotate objects 202, 204 that may be associated with a moderate level of situational awareness of the driver 108 and that may influence the operation of the ego vehicle 102 at one or more future time steps as medium importance objects. Additionally, the importance annotation module 126 may annotate objects 202, 204 that may be associated with a high level of situational awareness and that may not directly influence the operation of the ego vehicle 102 at one or more future time steps as low importance objects.

In one embodiment, upon annotating the levels of importance to each of the objects 202, 204 that may be included within the driving scene 200, the importance annotation module 126 may be configured to communicate data pertaining to the annotated levels of importance to the vehicle control module 128 of the awareness support application 106. With continued reference to FIG. 5, the method 500 may proceed to block 508, wherein the method 500 may include communicating control signals to electronically control one or more components of the ego vehicle 102 based on the annotated levels of importance associated with each of the objects 202, 204.

In an exemplary embodiment, the vehicle control module 128 may be configured to analyze the levels of importance annotated with respect to each of the objects 202, 204 that may be included within the driving scene 200. Upon analyzing the levels of importance, the vehicle control module

128 may be configured to send one or more commands to the ECU 104 of the ego vehicle 102 to control one or more display devices within the ego vehicle 102 to present the ADAS user interface. As discussed, the ADAS user interface may present the driving scene 200 of the ego vehicle 102 (including the objects 202, 204 that are located within the driving scene 200).

In one embodiment, the vehicle control module 128 may control the presentation of the ADAS user interface with selective highlighting of objects annotated as high importance objects and/or medium importance objects using AR cues through the one or more display devices of the ego vehicle 102. Referring again to FIG. 3, the vehicle control module 128 may be configured to present the ADAS user interface to represent the driving scene 200 of the ego vehicle 102 as captured within the image(s) of the driving scene 200 included within the image data provided by the vehicle camera system 110. The driving scene 200 may include the dynamic objects 202 and the static objects 204 that may be captured by the vehicle camera system 110 of the ego vehicle 102. In an exemplary embodiment, the awareness support application 106 may be configured to process highlighted color-coded bounding boxes 302, 304 around respective dynamic objects 202 and/or static objects 204 that may be based on respective annotated levels of importance.

In one embodiment, objects 202, 204 that may be annotated as high importance objects by the importance annotation module 126 (at block 506) may be processed with particular color-coded bounding boxes 302 (e.g., dark orange) that may change in color intensity, hue, and/or may be associated with audio alerts. The processing of highlighted color-coded bounding boxes 302 may be based on the position of the ego vehicle 102 with respect to the respective object(s) 202, 204, a determined driving scene complexity value associated with the driving scene 200, dynamic data associated with the operation of the ego vehicle 102 (e.g., speed, acceleration, steering angle), and/or the situational awareness of the driver 108 of the ego vehicle 102 with respect to the respective object(s) 202, 204.

Additionally, objects 202, 204 that may be annotated as medium importance objects by the importance annotation module 126 (at block 506) may be processed with particular color-coded bounding boxes 304 (e.g., light orange) that may be presented in a lower color intensity, hue, and/or may be associated with different audio alerts than provided for high importance objects. The processing of highlighted color-coded bounding boxes 304 may be based on the position of the ego vehicle 102 with respect to the respective object(s) 202, 204, a determined driving scene complexity value associated with the driving scene 200, dynamic data associated with the operation of the ego vehicle 102 (e.g., speed, acceleration, steering angle), and/or the situational awareness of the driver 108 of the ego vehicle 102 with respect to the respective object(s) 202, 204.

In an additional embodiment, upon the presentation of the ADAS user interface, the vehicle control module 128 may utilize adaptive highlighting to modify the highlighting of particular objects 202, 204 based on a real-time driver reaction to the presentation of the AR cues through the ADAS user interface through one or more of the display devices of the ego vehicle 102. In one configuration, to account for changes in the driving scene 200 which may relate to a change in the driver's fixation and/or the operation of the ego vehicle 102 (e.g., caused by a change in traffic light color, stopping of another vehicle to parallel park in front of the ego vehicle 102, etc.), the vehicle control module 128 may execute an adaption-based highlighting strategy.

In particular, the vehicle control module 128 may be configured to utilize the storage unit 116 to store data points associated with one or more previous contexts that pertain to the presentation of AR cues in the form of color-coded bounding boxes 302, 304 at one or more past time steps (e.g., t−1, t−2, t−n). In particular, at time t, the storage unit 116 may be populated with:

$O_{seen}$: objects that were fixated during a past τ duration $O_r$: objects that are present in a current frame with their categories, relative positions, and importance $O_h$: objects that are annotated as high importance objects in the current frame with their categories, coordinates and importance Om: objects that are highlighted with medium importance level in the current frame with their categories, and relative positions G: driver's gaze location In one embodiment, upon controlling the ADAS to present the AR user interface that includes AR cues in the form of highlighted color-coded bounding boxes 302, 304, the vehicle control module 128 may access the storage unit 116 to determine whether one or more objects 202, 204 have been fixated by the driver 108 in the past T time. The vehicle control module 128 may thereby determine if an importance level annotated to any of the objects 202, 204 is to be increased from a low importance level to a medium importance level or from a medium importance level to a high importance level. Additionally, the vehicle control module 128 may determine if an importance level annotated to any of the objects 202, 204 is to be decreased from a high importance level to a medium importance level or form a medium importance level to a low importance level. The increase or decrease of importance may indicate that the respective object's behavior has changed (e.g., change in trajectory of another vehicle, change of a traffic signal from green to yellow, change of a traffic signal from red to green), which may need to be attended to by the driver 108 of the ego vehicle 102.

The highlighting with respect to providing a color intensity, hue, and/or various types of audio alerts of one or more objects 202, 204 may be modified based on the increased importance level or decreased importance level annotated to one or more objects 202, 204. Accordingly, the vehicle control module 128 is configured to implement real-time adaptive warning feedback using AR cues that highlight important objects by combining eye tracking output with scene context of the driving scene 200 of the ego vehicle 102 during a plurality of time steps to account for changes that take place within respect to objects 202, 204 located within the driving scene 200.

In one embodiment, the vehicle control module 128 may additionally or alternatively output vehicle autonomous commands that may be associated with driving parameters to autonomously control the operation of the ego vehicle 102 to account for one or more objects 202, 204 that may be annotated as high importance objects and/or medium importance objects. In some embodiments, the vehicle control module 128 may output vehicle autonomous commands that may be associated with driving parameters to autonomously control the operation of the ego vehicle 102 to account for one or more objects 202, 204 that may be located within a prospective path of the ego vehicle 102, and/or one or more objects 202, 204 that may be associated with a lower situational awareness of the driver 108.

The vehicle control module 128 may be configured to communicate the autonomous control commands to the vehicle autonomous controller 118 of the ego vehicle 102. The vehicle autonomous controller 118 may thereby operably control the vehicle systems/control units 120 to autonomously operate the ego vehicle 102 according to the autonomous control commands to provide one or more driving maneuvers to account for the one or more high importance objects and/or one or more medium importance objects that may be located within the driving scene 200, one or more objects 202, 204 that may be located within a prospective path of the ego vehicle 102, and/or one or more objects 202, 204 that may be associated with the lower situational awareness of the driver 108.

Figure 6:
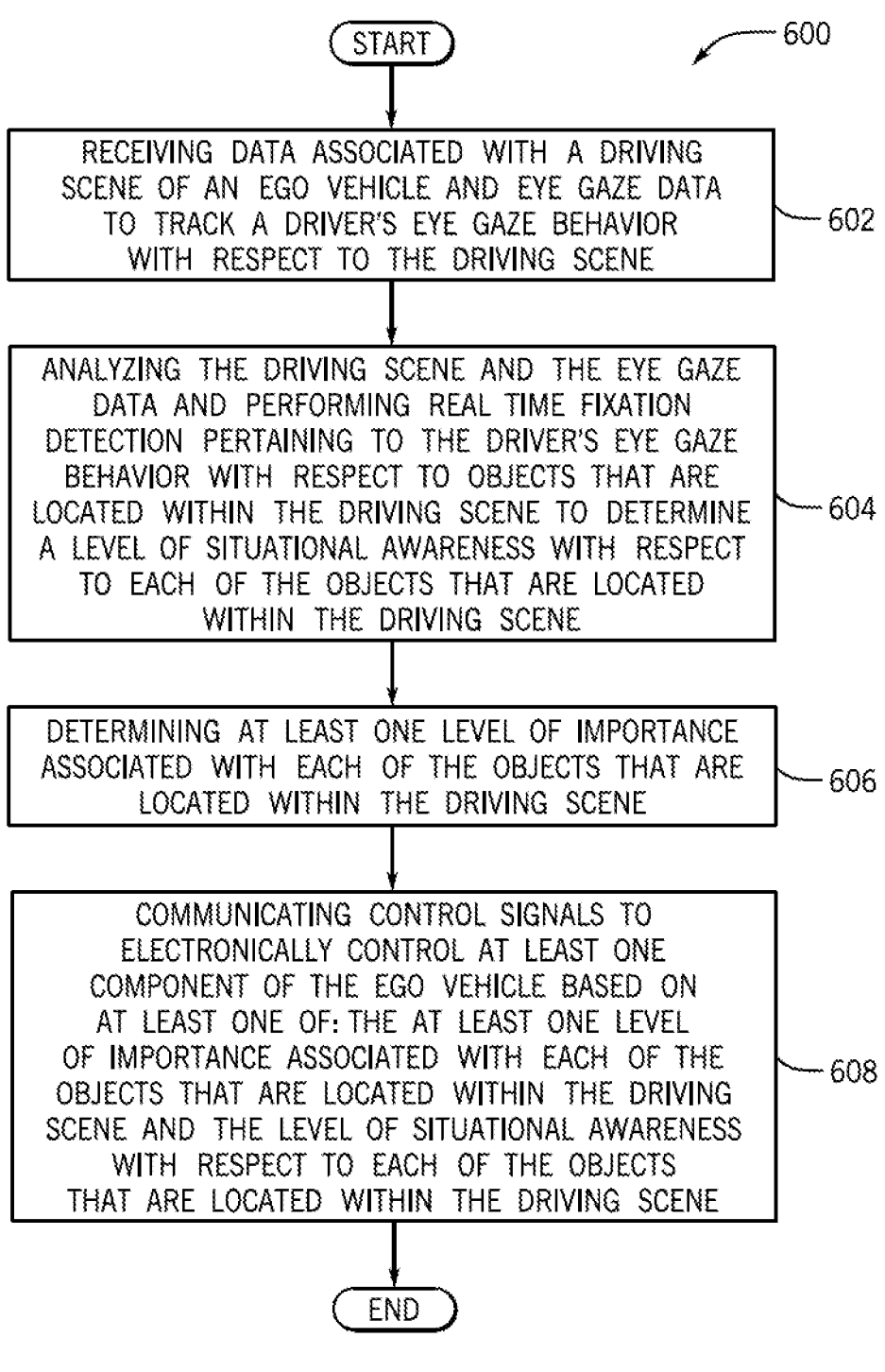
FIG. 6 is a process flow diagram of a method for providing a situational awareness based adaptive driver vehicle interface according to an exemplary embodiment of the present disclosure.

FIG. 6 is a process flow diagram of a method 600 for providing a situational awareness based adaptive driver vehicle interface according to an exemplary embodiment of the present disclosure. FIG. 6 will be described with reference to the components of FIG. 1 though it is to be appreciated that the method 600 of FIG. 6 may be used with other systems/components. The method 600 may begin at block 602, wherein the method 600 may include receiving data associated with a driving scene 200 of an ego vehicle 102 and eye gaze data to track a driver's eye gaze behavior with respect to the driving scene 200.

The method 600 may proceed to block 604, wherein the method 600 may include analyzing the driving scene 200 and the eye gaze data and performing real time fixation detection pertaining to the driver's eye gaze behavior with respect to objects 202, 204 that are located within the driving scene 200 to determine a level of situational awareness with respect to each of the objects 202, 204 that are located within the driving scene 200. The method 600 may proceed to block 606, wherein the method 600 may include determining at least one level of importance associated with each of the objects 202, 204 that are located within the driving scene 200. The method 600 may proceed to block 608, wherein the method 600 may include communicating control signals to electronically control at least one component of the ego vehicle 102 based on at least one of: the at least one level of importance associated with each of the objects 202, 204 that are located within the driving scene 200 and the level of situational awareness with respect to each of the objects that are located within the driving scene 200.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing a situational awareness based adaptive driver vehicle interface comprising:

receiving data associated with a driving scene of an ego vehicle and eye gaze data to track a driver's eye gaze behavior with respect to the driving scene;

analyzing the driving scene and the eye gaze data and performing real time fixation detection pertaining to the driver's eye gaze behavior with respect to objects that are located within the driving scene to determine one of multiple levels of situational awareness with respect to each of the objects that are located within the driving scene;

determining at least one level of importance associated with each of the objects that are located within the driving scene;

determining a driving scene complexity value that pertains to a level of complexity associated with operating the ego vehicle within the driving scene;

generating augmented reality cues as highlighted color-coded bounding boxes that are processed around high importance objects; and communicating control signals to electronically control at least one component of the ego vehicle to provide the situational awareness based adaptive driver vehicle interface including the augmented reality cues, wherein the augmented reality cues are based on at least one of: a position of the ego vehicle, the driving scene complexity value, and the level of situational awareness, wherein when one of the high important objects is determined to have a lower level of the situational awareness based on the driver's eye gaze behavior, the adaptive driver vehicle interface annotates the high important object having the lower level of the situational awareness with a selected one of the highlighted color-coded bounding boxes.

2. The computer-implemented method of claim 1, wherein analyzing the driving scene includes analyzing image data associated with the driving scene of the ego vehicle to determine a number of dynamic objects and static objects, road configurations of the driving scene, a terrain of the driving scene, and environmental conditions occurring within the driving scene to output e the driving scene complexity value that pertains to a level of complexity that is associated with operating the ego vehicle within the driving scene.

3. The computer-implemented method of claim 2, wherein performing real time fixation detection pertaining to the driver's eye gaze behavior includes analyzing eye gaze data communicated by eye gaze sensors along with image data of the driving scene to identify a homography between at least one image of the driving scene and the driver's eye gaze behavior towards the driving scene.

4. The computer-implemented method of claim 3, wherein performing real time fixation detection pertaining to the driver's eye gaze behavior includes super imposing markers around edges of at least one image of the driving scene and tracking the driver's eye gaze behavior by tracking the markers in real time during a duration of a video image stream to identify the homography between at least one image of the driving scene and the driver's eye gaze behavior towards the driving scene, wherein the markers are dynamically adjusted based on the determined driving scene complexity value.

5. The computer-implemented method of claim 4, wherein performing real time fixation detection pertaining to the driver's eye gaze behavior includes performing fixation identification by analyzing time coordinates associated with a time of fixation that pertains to different portions of the driving scene that include dynamic objects and static objects and labeling fixations and saccades pertaining to the driver's eye gaze behavior with respect to each of the dynamic objects and the static objects.

6. The computer-implemented method of claim 5, wherein the level of situational awareness with respect to each of the dynamic objects and the static objects located within the driving scene are determined based on analysis of a fixation time of each of the fixations that pertain to each of the dynamic objects and the static objects.

7. The computer-implemented method of claim 6, wherein determining at least one level of importance associated with each of the objects includes analyzing a position, a classification, and dynamic properties of the ego vehicle and a travel path of dynamic objects and annotating dynamic objects that include a travel path that overlaps with a prospective path of the ego vehicle at a future time step as high importance objects.

8. The computer-implemented method of claim 6, wherein determining at least one level of importance associated with each of the objects includes analyzing a position, a classification, and dynamic properties of the ego vehicle and characteristics of static objects and annotating static objects that cause a modification of an operation of the ego vehicle at a future time step as high importance objects, wherein the future time step is dynamically adjusted based on the current speed of the ego vehicle and the driving scene complexity value.

9. The computer-implemented method of claim 1, wherein
the one of multiple levels of the situational awareness with respect to each of the objects is determined based on each fixation time of an eye gaze with respect to each of the objects.

10. A system for providing a situational awareness based adaptive driver vehicle interface comprising:
a memory storing instructions when executed by a processor cause the processor to:
receive data associated with a driving scene of an ego vehicle and eye gaze data to track a driver's eye gaze behavior with respect to the driving scene;
analyze the driving scene and the eye gaze data and performing real time fixation detection pertaining to the driver's eye gaze behavior with respect to objects that are located within the driving scene to determine one of multiple levels of situational awareness with respect to each of the objects that are located within the driving scene;
determine at least one level of importance associated with each of the objects that are located within the driving scene;

determine a driving scene complexity value that pertains to a level of complexity associated with operating the ego vehicle within the driving scene;
generate augmented reality cues as highlighted color-coded bounding boxes that are processed around high importance objects; and
communicate control signals to electronically control at least one component of the ego vehicle to provide the situational awareness based adaptive driver vehicle interface including the augmented reality cues, wherein the augmented reality cues are based on at least one of: a position of the ego vehicle, the driving scene complexity value, and the level of situational awareness, wherein when one of the high important objects is determined to have a lower level of the situational awareness based on the driver's eye gaze behavior, the processor is configured to annotate the high important object having the lower level of the situational awareness with a selected one of the highlighted color-coded bounding boxes.

11. The system of claim 10, wherein analyzing the driving scene includes analyzing image data associated with the driving scene of the ego vehicle to determine a number of dynamic objects and static objects, road configurations of the driving scene, a terrain of the driving scene, and environmental conditions occurring within the driving scene to output a driving scene complexity value that pertains to a level of complexity that is associated with operating the ego vehicle within the driving scene.

12. The system of claim 11, wherein performing real time fixation detection pertaining to the driver's eye gaze behavior includes analyzing eye gaze data communicated by eye gaze sensors along with image data of the driving scene to identify a homography between at least one image of the driving scene and a real-time eye gaze of an operator of the ego vehicle towards the driving scene.

13. The system of claim 12, wherein performing real time fixation detection pertaining to the driver's eye gaze behavior includes super imposing markers around edges of at least one image of the driving scene and tracking the driver's eye gaze behavior by tracking the markers in real time during a duration of a video image stream to identify the homography between at least one image of the driving scene and the driver's eye gaze behavior towards the driving scene.

14. The system of claim 13, wherein performing real time fixation detection pertaining to the driver's eye gaze behavior includes performing fixation identification by analyzing time coordinates associated with a time of fixation that pertains to different portions of the driving scene that include dynamic objects and static objects and labeling fixations and saccades pertaining to the driver's eye gaze behavior with respect to each of the dynamic objects and the static objects.

15. The system of claim 14, wherein the level of situational awareness with respect to each of the dynamic objects and the static objects located within the driving scene are determined based on analysis of a fixation time of each of the fixations that pertain to each of the dynamic objects and the static objects.

16. The system of claim 15, wherein determining at least one level of importance associated with each of the objects includes analyzing a position, a classification, and dynamic properties of the ego vehicle and a travel path of dynamic objects and annotating dynamic objects that include a travel path that overlaps with a prospective path of the ego vehicle at a future time step as high importance objects.

17. The system of claim 15, wherein determining at least one level of importance associated with each of the objects includes analyzing a position, a classification, and dynamic properties of the ego vehicle and characteristics of static objects and annotating static objects that cause a modification of an operation of the ego vehicle at a future time step as high importance objects.

18. The system of claim 10, wherein the one of multiple levels of the situational awareness with respect to each of the objects is determined based on each fixation time of an eye gaze with respect to each of the objects.

19. A non-transitory computer readable storage medium storing instructions that when executed by a computer, which includes a processor perform a method, the method comprising:

receiving data associated with a driving scene of an ego vehicle and eye gaze data to track a driver's eye gaze behavior with respect to the driving scene;

analyzing the driving scene and the eye gaze data and performing real time fixation detection pertaining to the driver's eye gaze behavior with respect to objects that are located within the driving scene to determine one of multiple levels of situational awareness with respect to each of the objects that are located within the driving scene;

determining at least one level of importance associated with each of the objects that are located within the driving scene;

determining a driving scene complexity value that pertains to a level of complexity associated with operating the ego vehicle within the driving scene;

generating augmented reality cues as highlighted color-coded bounding boxes that are processed around high importance objects; and communicating control signals to electronically control at least one component of the ego vehicle to provide the situational awareness based adaptive driver vehicle interface including the augmented reality cues, wherein the augmented reality cues are based on at least one of: a position of the ego vehicle, the driving scene complexity value, and the level of situational awareness, wherein when one of the high important objects is determined to have a lower level of the situational awareness based on the driver's eye gaze behavior, the processor is configured to annotate the high important object having the lower level of the situational awareness with a selected one of the highlighted color-coded bounding boxes.

20. The non-transitory computer readable storage medium of claim 19, wherein the one of the multiple levels of the situational awareness with respect to each of the objects is determined based on each fixation time of an eye gaze with respect to each of the objects.

\* \* \* \* \*